A. B. MILLER.
DEVICE FOR RAISING A HARROW OR PLOW FROM THE GROUND.
APPLICATION FILED SEPT. 13, 1916.
1,220,136.
Patented Mar. 20, 1917.
2 SHEETS—SHEET 2.
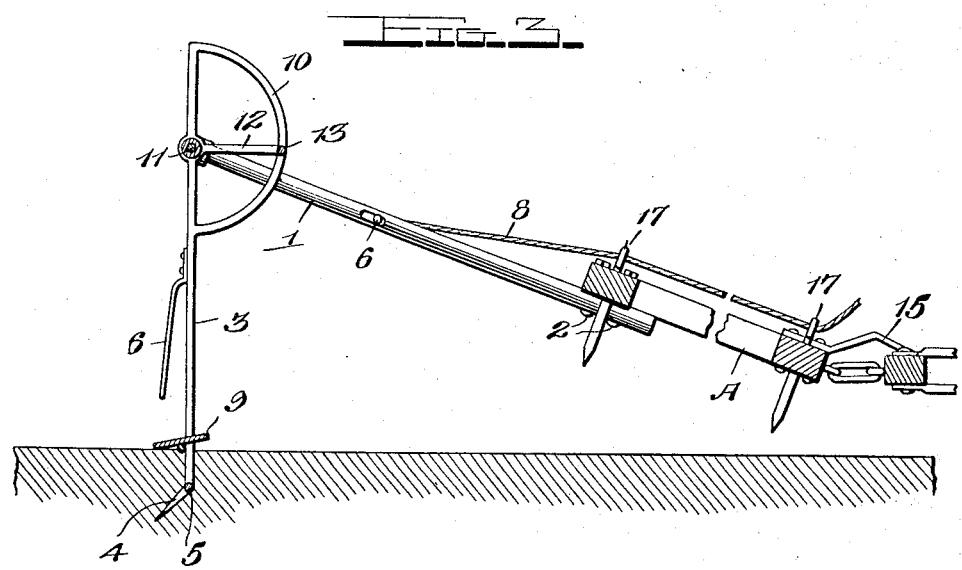
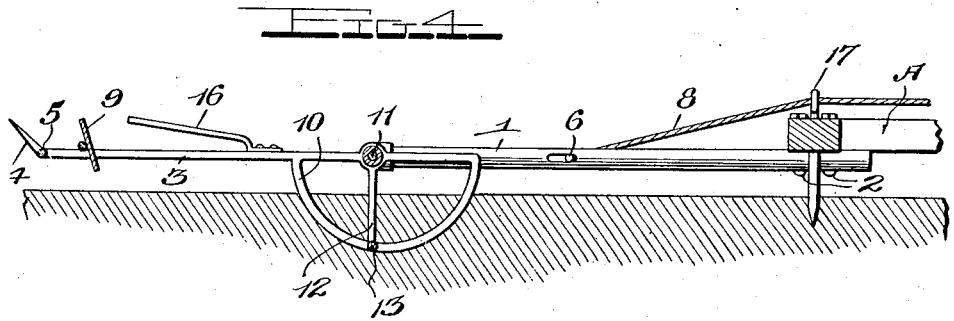
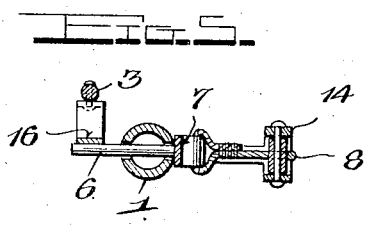
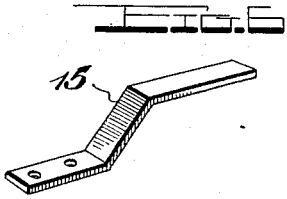

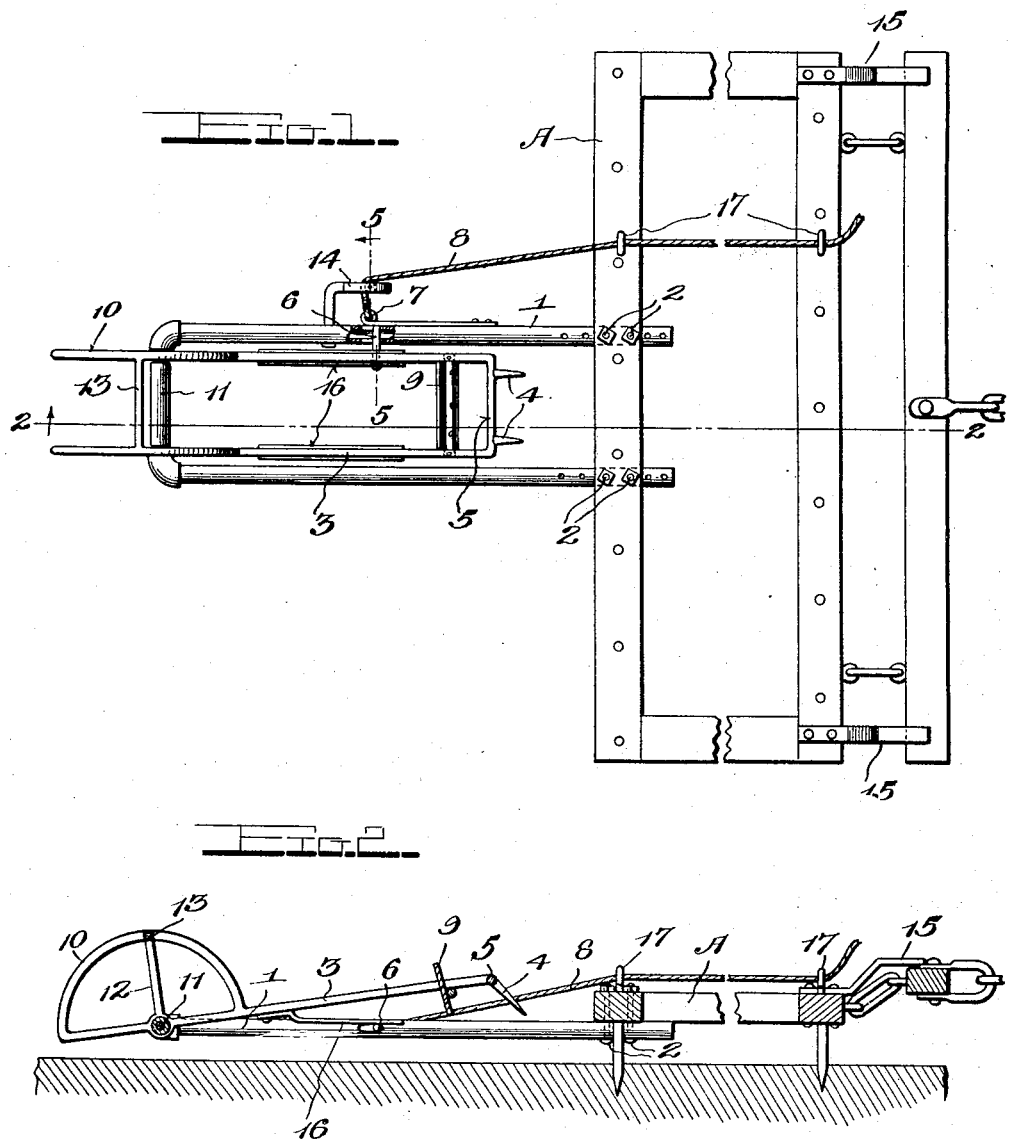

UNITED STATES PATENT OFFICE.

ARTHUR BENN MILLER, OF ALICEL, OREGON.

DEVICE FOR RAISING A HARROW OR PLOW FROM THE GROUND.

1,220,136.  Specification of Letters Patent.  Patented Mar. 20, 1917.

Application filed September 13, 1916.  Serial No. 119,812.

*To all whom it may concern:*

Be it known that I, ARTHUR BENN MILLER, a citizen of the United States, residing at Alicel, in the county of Union and State of Oregon, have invented a new and useful Device for Raising a Harrow or Plow from the Ground While it is in Motion, of which the following is a specification.

The object of my invention is to provide a novel attachment for harrows, plows and the like adapted automatically to raise the implement from the ground in order to disengage it from obstructions which it may encounter, or to release an accumulation of weeds or trash that may obstruct the progress of the machine. It is an especial object of my invention to provide a device that is of simple construction, which does not require a plurality of levers for its operation and which will automatically right itself and return to its normal position after it has released the harrow or plow from obstructions. In that connection it is my object to provide a device that requires but one act on the part of the operator, and not two acts as in inventions in this art heretofore devised. It is a further object of my invention to effect a novel tilting of the harrow by means of this attachment due to its peculiar form, first by suddenly elevating the rear of the harrow as the device is set into operation and almost immediately thereafter raising the forward part of the harrow and thus cleaning that also by means of the mechanism illustrated. It is further my object to provide a device adapted for use with sectional harrows, one of the devices being used in connection with each section and being capable of operation from substantially the same point, thus saving trouble for the operator.

I attain the objects of my invention by the mechanism illustrated in the accompanying drawings, in which—

Figure 1 is a top plan of my invention attached to a harrow; Fig. 2 is a section on line 2—2 of Fig. 1; Fig. 3 is a similar view but with the device in operating position with the harrow raised; Fig. 4 is a similar view as the device appears when the harrow again returns to the ground and before the device has returned to its normal position; Fig. 5 is a detail sectional view on line 5—5 of Fig. 1; and Fig. 6 is a detail of bar 15.

Like numerals designate like parts in each of the views.

Referring to the accompanying drawings there is illustrated a harrow A to which my device is attached. I provide a suitable trailing frame preferably of U-shape adjustably attached to the harrows by means of bolts 2, the ends of the frame 1 being provided with a plurality of orifices to permit of adjusting its position in relation to the harrow. Extending longitudinally of the frame 1 is an elevating device 3 pivotally mounted on the frame 1 as illustrated, and having offset teeth 4 projecting downward from the crossbar 5 at its forward end. The elevating device 3 is provided at its rear portion with suitable segments 10 positioned as illustrated and suitably braced by braces 12 and 13. Depending from member 3 is a suitable arm 16, which normally holds member 3 in the position illustrated in Fig. 2, the arm 16 resting on a projecting catch 6 having an eye 7 to which a suitable rope 8 for operating the device is attached. The rope 8 extends from eye 7 laterally through a suitable guide 14, and thence forward to and through suitable guiding pieces or screw-eyes 17 secured to the harrow or other implement to which the attachment is applied. I provide a novel stop-plate 9 to limit the projection of the tooth end of elevating device 3 into the ground when it is operated, member 9 being suitably positioned to prevent the teeth from going too far into the earth. Plates 15 are provided at spaced portions of the draw-bar of the harrow as illustrated in Figs. 1 and 2 to prevent its interference with the tilting operation of the harrow. Elevating device 3 is pivotally mounted on the cross-bar 11 of frame 1 at a portion thereof forward of the median portion of segments 10. It is within the contemplation of my invention to provide suitable pulleys in lieu of the guiding devices 14 and 17 illustrated, for guiding the rope 8. The teeth 4 may be either solid or removable to permit of the use of different sizes. Stop-plate 9 may be adjustably mounted on elevating device 3.

In operating the device it is simply necessary to pull the rope 8 which is attached to eye 7 of the laterally operating spring catch 6, thus withdrawing its support from arm 16 and dropping the elevating device from its normally raised position so as to allow teeth 4 to engage in the ground. When this occurs the device will raise the rear of the harrow as illustrated in Fig. 3, thus disengaging it from any obstruction, weeds or other accumulation, thereafter dropping it to the ground as shown in Fig. 4. The stop-plate 9 prevents the teeth from projecting too far into the earth and facilitates the operation of the attachment. When the device moves to the position shown in Fig. 3 the forward part of the harrow is tilted upward, in consequence of the provision of plates 15 the forward ends of which rest and pivot on the draw-bar of the harrow, thus resulting in the cleaning of the forward as well as the rear part. The implement is automatically returned to the position shown in Fig. 2 from the position shown in Fig. 4 by reason of the operation of segments 10 which engage the ground, the weight of frame 1 bearing on them and causing the elevating device 3 to rotate to its original position. By employing a rope instead of levers for the actuation of the elevating device it is possible to operate it from any desired point, or to operate a plurality of the attachments conveniently on sectional harrows.

What I claim is:

1. In a device for dumping harrows, plows and the like, the combination of a frame attached to the harrow, a toothed elevating device pivotally mounted on the frame, the rear portion thereof carrying segment members, a catch mounted on the frame releasably supporting the elevating device clear from the ground, and a rope operatively connected to the catch, whereby the device may be operated by merely pulling the rope.

2. In a device for dumping harrows, plows and the like, the combination of a frame attached to the harrow, a toothed elevating device pivotally mounted on the frame, a stop-plate adjustably mounted on the elevating device in proximity to its toothed portion, a catch mounted on the frame releasably supporting the elevating device clear from the ground, a rope attached to the catch, and guiding means for the rope, for the purposes described.

3. In a device for dumping harrows, plows and the like, the combination of a U-shaped frame attached to the harrow, an approximately U-shaped elevating device, the rear portion thereof carrying upwardly extending segments and the forward portion carrying downwardly inclined teeth, a stop-plate for limiting the movement of the device, a catch mounted on the frame releasably supporting the elevating device clear from the ground, a rope attached to the catch, and guiding means for the rope, for the purposes described.

4. In a device for dumping harrows, plows and the like, the combination of a trailing frame, an elevating device having its rear portion pivotally mounted on the trailing frame, downwardly inclined teeth at the forward end of the elevating device, a stop-plate adjustably mounted in proximity to the teeth, upwardly extending segments on the rear portion of the elevating device positioned over its pivotal portion and having the main portions of the segment positioned rearward of the said pivotal portion, a spring arm attached to the elevating device, a spring catch releasably engaging the arm, a rope attached to the catch and means for guiding the rope to any desired position for operating the device.

5. In a device for dumping harrows, plows and the like, the combination of a frame attached to the harrow, a draw-bar, a toothed elevating device pivotally mounted on the frame, the elevating device having upwardly projecting segments on its rear portion and toothed members on its forward portion, a catch releasably supporting the elevating device clear from the ground, a rope attached to the catch, guiding means for the rope, upwardly bent plates affixed to the forward crossbar of the harrow and having their forward edges pivotally resting on the draw-bar, whereby to facilitate clearing the forward as well as the rear portion of the harrow from obstructions when the elevating device is operated, as described.

ARTHUR BENN MILLER.

Witnesses:
GEORGE MILLER,
JNO. S. HODGIN.

Copies of this patent may be obtained for five cents each, by addressing the "Commissioner of Patents, Washington, D. C."